United States Patent
Toma et al.

(10) Patent No.: US 10,861,500 B2
(45) Date of Patent: *Dec. 8, 2020

(54) DATA TRANSMISSION METHOD, DATA PLAYBACK METHOD, DATA TRANSMISSION DEVICE, AND DATA PLAYBACK DEVICE

(71) Applicant: Sun Patent Trust, New York, NY (US)

(72) Inventors: Tadamasa Toma, Osaka (JP); Noritaka Iguchi, Osaka (JP); Takahiro Nishi, Nara (JP); Hisaya Katou, Kanagawa (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/658,200

(22) Filed: Oct. 21, 2019

(65) Prior Publication Data

US 2020/0051595 A1 Feb. 13, 2020

Related U.S. Application Data

(63) Continuation of application No. 15/960,795, filed on Apr. 24, 2018, now Pat. No. 10,490,225, which is a (Continued)

(30) Foreign Application Priority Data

Jun. 19, 2014 (JP) .................................. 2014-126553

(51) Int. Cl.
*G11B 27/10* (2006.01)
*H04N 21/43* (2011.01)
(Continued)

(52) U.S. Cl.
CPC ............ *G11B 27/10* (2013.01); *H04N 21/242* (2013.01); *H04N 21/4302* (2013.01);
(Continued)

(58) Field of Classification Search
CPC ........ H04N 19/00; H04N 5/782; H04N 5/956; H04N 9/475; H04N 9/80; G11B 20/12; G11B 27/3027
(Continued)

(56) References Cited

U.S. PATENT DOCUMENTS 4,660,099 A * 4/1987 Sugiyama .............. G11B 20/10
360/48
9,300,557 B2 3/2016 Kim
(Continued)

FOREIGN PATENT DOCUMENTS

WO 2013/146571 10/2013

OTHER PUBLICATIONS

Text of ISO/IEC DIS 23008-1 MPEG Media Transport, 104, MPEG Meeting; Apr. 22, 2013-Apr. 26, 2013; Incheon; (Motion Picture Expert Group or ISO/IEC JTC1/SG29/WG11), No. N13516, May 10, 2013 (May 10, 2013), pp. 1-86.*
(Continued)

*Primary Examiner* — Thai Q Tran
*Assistant Examiner* — Syed Y Hasan
(74) *Attorney, Agent, or Firm* — Wenderoth, Lind & Ponack, L.L.P.

(57) ABSTRACT

A data transmission method according to one aspect of the present disclosure includes: generating a plurality of MPUs, reference clock time information, and leading clock time information indicating a leading PTS that is a clock time at which a leading access unit in the MPU is presented, transmitting the generated plurality of MPUs, reference clock time information, and leading clock time information,
(Continued)

wherein the leading clock time information indicates the leading PTS of the plurality of MPUs of which presentation is started after the leading clock time information is transmitted in the generated plurality of MPUs, and each of the generated plurality of MPUs indicates a time point at which each access unit that does not exist in a head of the MPU is presented as a relative value to a time point of another access unit in the MPU.

10 Claims, 8 Drawing Sheets

Related U.S. Application Data continuation of application No. 14/951,759, filed on Nov. 25, 2015, now Pat. No. 9,984,726, which is a continuation of application No. PCT/JP2014/003462, filed on Jun. 30, 2014.

(60) Provisional application No. 61/842,480, filed on Jul. 3, 2013.

(51) Int. Cl.
| | |
|---|---|
| *H04N 21/24* | (2011.01) |
| *H04N 21/64* | (2011.01) |
| *H04N 21/84* | (2011.01) |
| *H04N 21/85* | (2011.01) |
| *H04L 5/14* | (2006.01) |
| *H04N 21/242* | (2011.01) |
| *H04N 21/643* | (2011.01) |
| *H04N 21/845* | (2011.01) |
| *H04N 21/8547* | (2011.01) |

(52) U.S. Cl.
CPC ....... *H04N 21/643* (2013.01); *H04N 21/8456* (2013.01); *H04N 21/8547* (2013.01); *H04L 5/143* (2013.01); *H04N 21/43* (2013.01)

(58) Field of Classification Search
USPC .............. 386/355, 264, 314, 326; 369/59.25, 369/59.26
See application file for complete search history.

(56) References Cited

U.S. PATENT DOCUMENTS

| | | |
|---|---|---|
| 2013/0086213 A1 | 4/2013 | Rhyu et al. |
| 2015/0010020 A1 | 1/2015 | Aoki |

OTHER PUBLICATIONS

International Search Report of PCT application No. PCT/JP2014/003462 dated Sep. 30, 2014.
Shuichi Aoki et al., "A Study on Media Transport Methods for Next-Generation Broadcasting Systems" ITE Technical Report, vol. 37, No. 9, 2013 (Whole sentence translation).
"Information technology—High efficiency coding and media delivery in heterogeneous environments—Part 1: MPEG media transport (MMT)", ISO/IEC FDIS 23008-1, 2013.
Extended European Search Report dated Jun. 15, 2016 in corresponding European Patent Application No. 14820582.6.
"Text of ISO/IEC DIS 23008-1 MPEG Media Transport", 104. MPEG Meeting; Apr. 22, 2013-Apr. 26, 2013; Incheon; (Motion Picture Expert Group or ISO/IEC JTC1/SC29/WG11), No. N13516, May 10, 2013 (May 10, 2013), pp. i-86.
Sungryeul Rhyu et al: "Contribution to MMT EE#4 (E1-LD)", 98. MPEG Meeting; Nov. 28, 2011-Dec. 2, 2011; Geneva; (Motion Picture Expert Group or ISO/IEC JTC1/SC29/WG11), No. m21535, Oct. 23, 2011 (Oct. 23, 2011), pp. 1-14.
Kwang-Deok Seo et al: "Proposed timing model for MMT system", 97. MPEG Meeting; Jul. 18, 2011-Jul. 22, 2011; Torino; (Motion Picture Expert Group or ISO/IEC JTC1/SC29/WG11), No. m21264, Jul. 13, 2011 (Jul. 13, 2011), pp. 1-5.
Summons to attend oral proceedings pursuant to Rule 115(1) EPC issued Mar. 5, 2018 in European Application No. 14820582.6.
Kyuheon Kim et al: "Review on current scene and presentation technologies for MMT-CI" 100, MPEG Meeting: Apr. 30, 2012-May 4, 2012; Geneva; (Motion Picture Expert Group or ISO/IEC JTC1/SC29/WG11), No. m25224, Apr. 30, 2012 (Apr. 30, 2012), XP030053567.

* cited by examiner

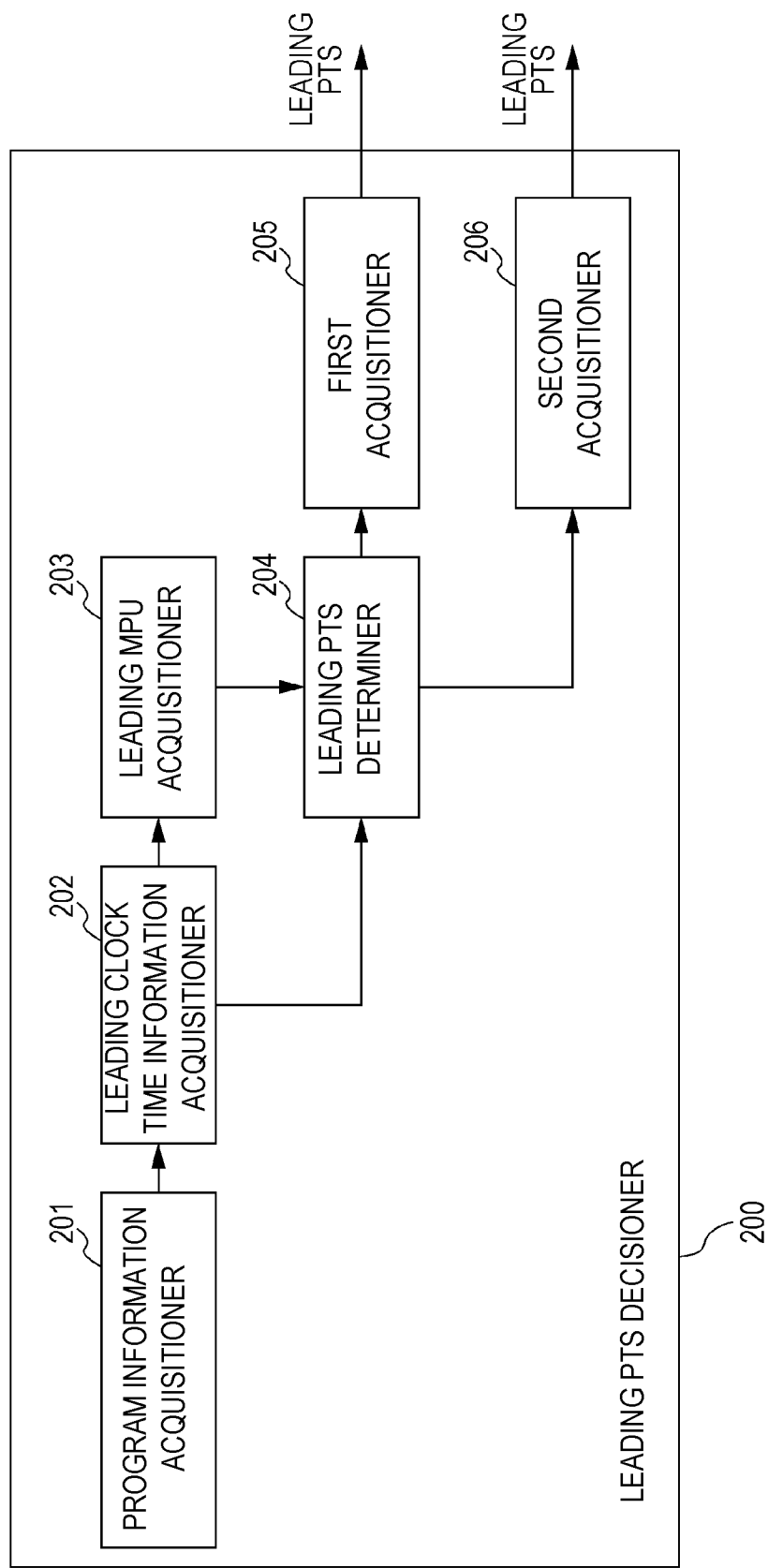

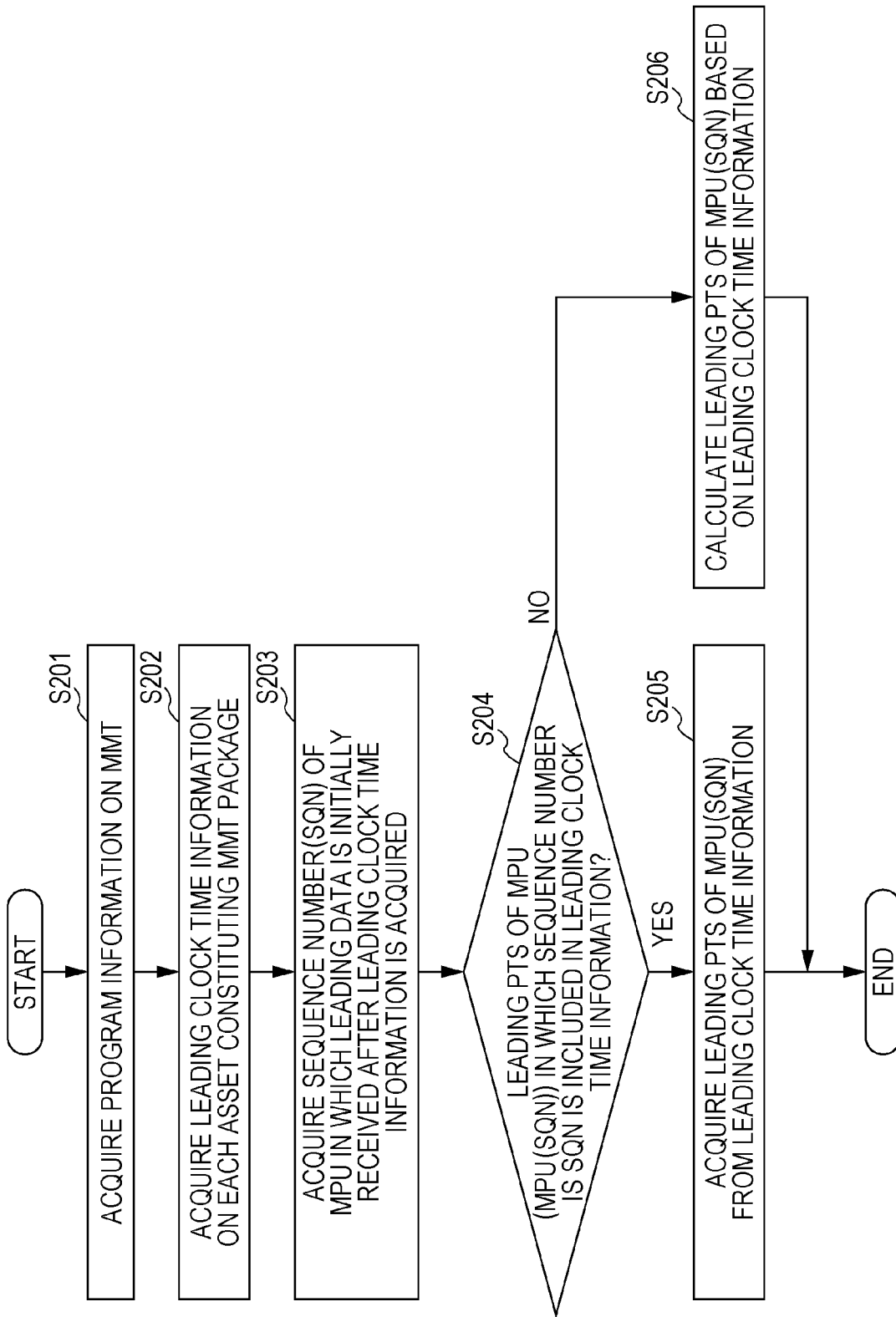

DATA TRANSMISSION METHOD, DATA PLAYBACK METHOD, DATA TRANSMISSION DEVICE, AND DATA PLAYBACK DEVICE

BACKGROUND

1. Technical Field

The present disclosure relates to a method for transmitting coded data and a method for playing back the coded data.

2. Description of the Related Art

MPEG-2 TS (Moving Picture Experts Group-2 Transport Stream) system is a media transport system widely used in a current broadcasting system. However, there are various limits when cooperation between broadcasting and communication is performed by the MPEG-2 TS system. Therefore, standardization of MMT (MPEG Media Transport) is in progress by MPEG (Moving Picture Experts Group), as a new media transport system assumed for use of versatile networks (for example, see NPTL 1).

CITATION LIST

Non-Patent Literature

NPTL 1: Information technology—High efficiency coding and media delivery in heterogeneous environment-Part1: SMPEG media transport (MMT), ISO/IEC DIS 23008-1

SUMMARY

In one general aspect, the techniques disclosed here feature a data transmission method including: generating a plurality of coded data units each of which is composed of a plurality of samples, reference clock time information indicating a reference clock time for setting a current clock time, and leading clock time information indicating a leading clock time that is a clock time a leading sample in a coded data unit is presented or decoded; and transmitting the generated plurality of coded data units, the generated reference clock time information, and the generated leading clock time information. At this point, the leading clock time information indicates respective leading clock time of each of a plurality of specific coded data units among the generated plurality of coded data units, the plurality of specific coded data units are a plurality of coded data units, which are to be presented or decoded after the leading clock time information is transmitted, and each of the generated plurality of coded data units indicates a time point at which each sample except for the leading sample in the coded data unit is presented or decoded, as a relative value to a time point of another sample in the coded data unit.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

The data transmission method of the present disclosure can sufficiently be applied to the broadcasting.

BRIEF DESCRIPTION OF DRAWINGS

FIG. 9 is a block diagram illustrating a leading PTS decisioner of the exemplary embodiment; and FIG. 10 is a flowchart illustrating operation of the leading PTS decisioner of the exemplary embodiment.

DESCRIPTION OF EMBODIMENT

Knowledge Used as Basis for the Present Invention

The inventor found that the following problem is generated in the data transmission method described in NPTL 1.

In MMT of a media transmission format, which is currently standardized by MPEG, an MPU (Media Processing Unit) of a coded data unit such as a coded content is constructed in a format in which a presentation (or display) clock time (PTS: Presentation Time Stamp) or a decoding clock time (DTS: Decoding Time Stamp) of the MPU cannot be indicated. Accordingly, only acquiring the MPU does not allow a data playback device to determine when the MPU is played back.

For this reason, it is assumed that a data transmission device transmits leading clock time information on the MPU to the data playback device. For example, the leading clock time information indicates a clock time (leading PTS) at which the presentation (or display) of the MPU is started. The leading PTS is indicated in a form identical to that of an absolute clock time. When the data playback device, which receives and plays back MMT data, plays back the MMT data, the data playback device makes a request for the MPU already stored in a server (data transmission device) together with the leading clock time information. When receiving the request, the data transmission device transmits the MPU to the data playback device together with the leading clock time information. Therefore, the data playback device plays back the MPU such that the presentation of the MPU is started at the leading PTS clock time indicated by the leading clock time information.

However, in the case where the MMT data, which is sequentially transmitted while generated, is sequentially received and played back, there is a problem in that the proper leading PTS cannot be acquired from the leading clock time information. The problem will be described below with reference to FIG. 1.

Figure 1:
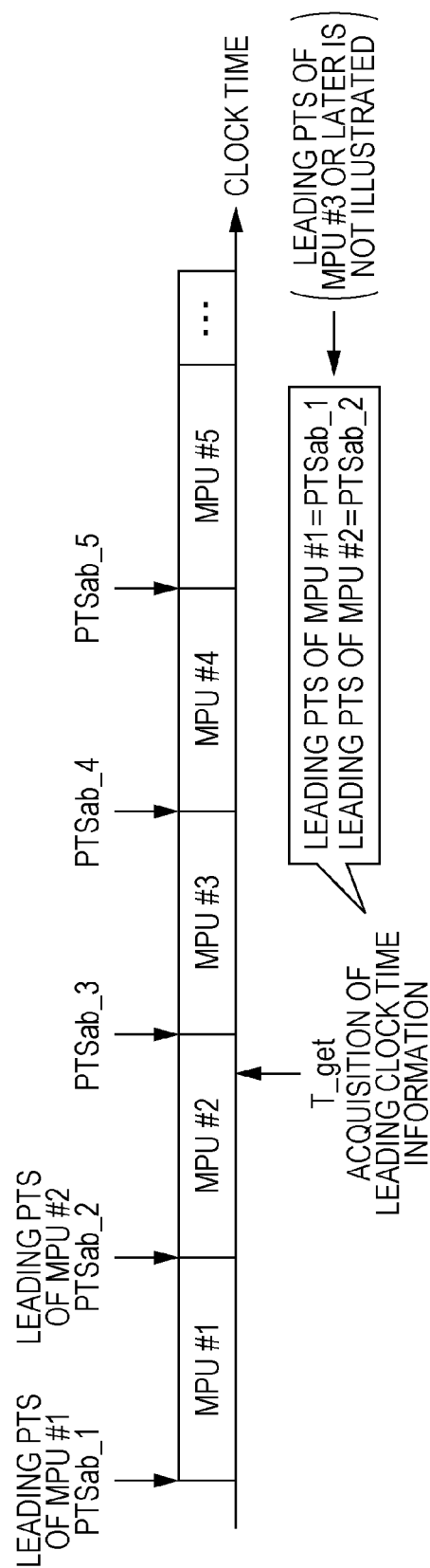
FIG. 1 is an explanatory view illustrating a conceivable problem of the data transmission method.

FIG. 1 is an explanatory view illustrating a conceivable problem of the data transmission method described in NPTL 1.

As illustrated in FIG. 1, the data transmission device transmits an asset of a data string constructed with a plurality of MPUs (MPU #1, MPU #2, MPU #3, . . . ) in the MMT. The leading PTSs of MPU #1 and MPU #2 are fixed at clock time T_get.

The data playback device acquires the leading clock time information at clock time T_get, and receives pieces of data of MPUS from MPU #3 in which processing is initially started after clock time T_get. In this case, only the leading PTSs (PTSab_1 and PTSab_2) of MPU #1 and MPU #2 are indicated in the leading clock time information, but the leading PTS (PTSab_3) of MPU #3 is not indicated. Accordingly, the data playback device cannot acquire the leading PTS of MPU #3.

Thus, there is the problem in that the data playback device cannot properly acquire the leading PTS of the received MPU when starting the reception and playback of the MPU distributed through the broadcasting or communication network in response to a user's acquisition request. That is, there is the problem in that a start clock time of the decoding and display (output for audio) of the MPU cannot be decided. When the leading PTS cannot be acquired, for example, the audio and video cannot synchronously be played back based on each PTS.

That is, there is the problem in that the conceivable data transmission method and data playback method and the data transmission device and data playback device can insufficiently be applied to the broadcasting in which the playback needs to be performed at a predetermined clock time.

In the conventional MMT, the PTS or DTS of the sample initially displayed or decoded in the MPU of the asset constructed according to the MMT is already known because it is assumed that an MMT file (MP4 file) is transmitted. Therefore, the data playback device can previously acquire the leading PTS or leading DTS of the MPU in which the playback is started. However, in the case where the data playback device plays back the transmitted MMT data while the data transmission device sequentially generates and transmits the MMT data, there is the problem in that a playback start time cannot be decided because the data playback device cannot previously acquire the absolute clock time of the leading PTS of the MPU in which the playback is started. That is, there is the problem in that the conventional MMT can insufficiently be applied to the MMT data transmitted by live broadcasting.

In order to solve the problem, a data transmission method according to one aspect of the present disclosure includes: a generation step of generating a plurality of coded data units each of which is constructed with a plurality of samples, reference clock time information indicating a reference clock time used to set a current clock time, and leading clock time information indicating a leading clock time of a clock time at which a leading sample in a coded data unit is presented or decoded; and a transmission step of transmitting the generated plurality of coded data units, the generated reference clock time information, and the generated leading clock time information. At this point, the leading clock time information indicates the leading clock time of each of a plurality of specific coded data units of the plurality of coded data units, which are presented or decoded after the leading clock time information is transmitted in the generated plurality of coded data units, and each of the generated plurality of coded data units indicates a time point at which each sample except for the leading sample in the coded data unit is presented or decoded as a relative value to a time point of another sample in the coded data unit.

Therefore, the leading clock time information indicates the leading clock times (for example, the leading PTS) of each of the plurality of specific coded data units (for example, the plurality of specific MPUs) in which the presentation or decoding is started after the transmission of the leading clock time information. When receiving the leading clock time information, the data playback device can acquire the leading clock time of each of the plurality of specific coded data units in which the presentation or decoding is started after that, namely, the proper leading clock time. As a result, the data playback device can properly start the presentation or decoding of each of the plurality of specific coded data units at each leading clock time. Accordingly, the data transmission device of the present disclosure can sufficiently be applied to the broadcasting in which the playback needs to be performed at the predetermined clock time. Because the leading clock time of each of the plurality of specific coded data units is indicated in the leading clock time information, when the data playback device can start the reception of another coded data unit even if the data playback device cannot receive one of the specific coded data units, the data playback device can start the presentation or decoding of the specific coded data unit at the proper clock time.

The leading clock time information may indicate at least the leading clock time of the coded data unit that is transmitted immediately after the leading clock time information is transmitted in the generated plurality of coded data units.

Therefore, the data playback device can early start the presentation or decoding of each of the plurality of specific coded data units at each proper leading clock time.

In the transmission step, the leading clock time information may periodically be transmitted.

Therefore, the data playback device can be notified of the leading clock times of many coded data units.

The leading clock time information may indicate the leading clock times of the plurality of specific coded data units in which the presentation or decoding is started until the clock time at which the next leading clock time information is transmitted.

Therefore, the leading clock time information indicates only the leading clock times of each of the plurality of specific coded data units in which the presentation or decoding is started at the clock time closer to the clock time the leading clock time information is transmitted, so that only the correct leading clock time can be indicated by the leading clock time information.

The data transmission method may further include a calculation step of calculating a final reception clock time by adding a propagation time necessary for a data playback device to receive data since the data transmission and a delay time necessary for the starting of the reception of the coded data unit since the data playback device receives the leading clock time at which information to the clock time the leading clock time information is transmitted. At this point, the leading clock time information indicates the leading clock times of all the coded data units in which the presentation or decoding is started until the final reception clock time since the clock time the leading clock time information is transmitted as the leading clock times of the plurality of specific coded data units in the generated plurality of coded data units.

Therefore, the leading clock time information indicates the plurality of leading clock times in which the propagation time and the delay time are taken into consideration, so that the leading clock time information can be prevented from not indicating the leading clock time of the coded data unit in which the presentation or decoding is started after the data playback device receives the leading clock time information.

A data playback method according to another aspect of the present disclosure includes: a reception step of receiving a plurality of coded data units each of which is constructed with a plurality of samples, reference clock time information indicating a reference clock time used to set a current clock time, and leading clock time at which information indicating a leading clock time of a clock time a leading sample in a coded data unit is presented or decoded; and a playback step of playing back the plurality of coded data units. At this point, the leading clock time information indicates the leading clock times of a plurality of specific coded data units of the plurality of coded data units, which are presented or decoded after the leading clock time information is received in the generated plurality of coded data units, each of the received plurality of coded data units indicates a time point at which each of a plurality of non-leading samples sample of a plurality of samples except for the leading sample in the coded data unit is presented or decoded as a relative value to a time point of another sample in the coded data unit, and, in the playback step, the plurality of samples included in the plurality of specific coded data units are played back so as to be presented or decoded at a time corresponding to a current clock time that is set according to the reference clock time indicated by the reference clock time information, a leading clock time of each of the plurality of specific coded data units indicated by the leading clock time information, and a relative value of each of the plurality of non-leading samples indicated by the received plurality of coded data units.

In the playback step, in playing back the leading sample in a processing target coded data unit of one of the plurality of specific coded data units, the leading sample may be presented or decoded when the current clock time that is set according to the reference clock time indicated by the reference clock time information reaches the leading clock time of the processing target coded data unit, the leading clock time being indicated by the leading clock time information. In the playback step, in playing back a processing target non-leading sample of one of the plurality of the non-leading samples in the processing target coded data unit, a processing clock time at which the processing target non-leading sample is presented or decoded may be calculated, and the processing target non-leading sample may be presented or decoded when the current clock time reaches the calculated processing clock time, and, in calculating the processing clock time, the processing clock time may be calculated by adding at least a relative value of the processing target non-leading sample in the relative values of the plurality of the non-leading samples to the leading clock time of the processing target coded data unit, the processing target non-leading sample being indicated by the processing target coded data unit, the leading clock time being indicated by the leading clock time information.

Therefore, all the samples (access units) included in the plurality of coded data units can be presented or decoded at the predetermined clock time, and the data playback method of the present disclosure can sufficiently be applied to the broadcasting in which the playback needs to be performed at the predetermined clock time.

These comprehensive or specific aspects may be implemented by a system, a method, an integrated circuit, a computer program, and a recording medium such as a computer-readable CD-ROM, or implemented by any combination of the system, the method, the integrated circuit, the computer program, and the recording medium.

An exemplary embodiment will specifically be described below with reference to the drawings.

The following exemplary embodiment illustrates a comprehensive or specific example. The following numerical value, shape, material, component, disposition and connection form of the component, step, and step sequence indicated in the exemplary embodiment are described only by way of example, but not limit the present disclosure. In the following components of the exemplary embodiment, the component that is not described in an independent claim indicating a highest concept is described as an arbitrary component.

Exemplary Embodiment

Figure 2:
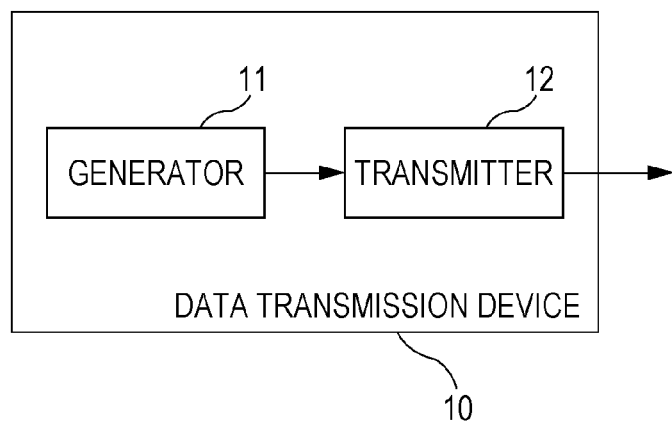
FIG. 2 is a block diagram illustrating a data transmission device according to an exemplary embodiment.

FIG. 2 is a block diagram illustrating a data transmission device of the exemplary embodiment.

Data transmission device 10 of the exemplary embodiment is a device that can sufficiently be applied to broadcasting, and data transmission device 10 includes generator 11 and transmitter 12.

Generator 11 generates the plurality of coded data units each of which is constructed with the plurality of samples, the reference clock time information indicating the reference clock time used to set the current clock time, and the leading clock time information indicating the leading clock time of the clock time the leading sample of the coded data unit is presented or decoded. Transmitter 12 transmits the generated plurality of coded data units, reference clock time information, and leading clock time information.

The leading clock time information indicates the leading clock time of each of the plurality of specific coded data units that are of the plurality of coded data units in which the presentation or decoding is started after the transmission of the leading clock time information in the plurality of coded data units. Each of the plurality of coded data units indicates a time point where each of the samples other than the leading sample in the coded data unit is presented or decoded as a relative value to a time point of another sample in the coded data unit.

Figure 3:
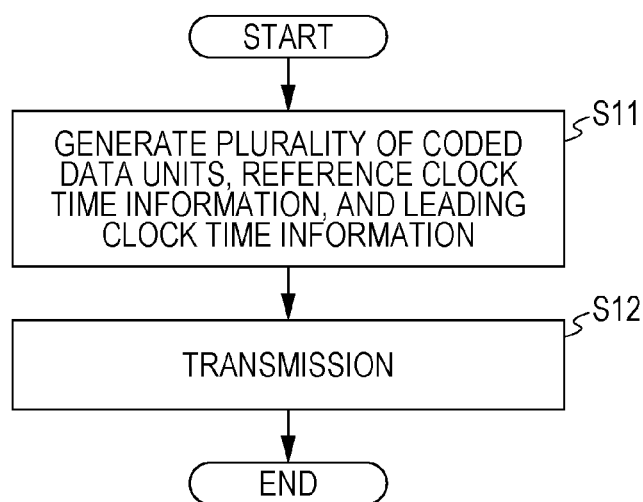
FIG. 3 is a flowchart illustrating operation of the data transmission device of the exemplary embodiment.

FIG. 3 is a flowchart illustrating operation of data transmission device 10 of the exemplary embodiment.

Generator 11 generates the plurality of coded data units, the reference clock time information, and the leading clock time information (Step S11). Transmitter 12 transmits the generated plurality of coded data units, reference clock time information, and leading clock time information (Step S12).

For example, the coded data unit is the MPU in the MMT, and the sample is the access unit. The reference clock time is a clock time common to data transmission device 10 and the data playback device that receives and plays back the data from data transmission device 10 or a clock time used to synchronize between data transmission device 10 and the data playback device. For example, the reference clock time is a UTC (Coordinated Universal Time) or an STC (System Time Clock). In each MPU in which the presentation or decoding is started after the transmission of the leading clock time information, the leading clock time information indicates identification information (such as a sequence number) on the MPU and the leading clock time of the clock time at which the leading access unit in the MPU is presented or decoded while the identification information on the MPU and the leading clock time are correlated with each other. The leading sample (access unit) in the coded data unit (MPU) is a leading sample in presentation order or a leading sample in decoding order. When the leading clock time indicated by the leading clock time information is the clock time (leading PTS) at which the leading sample is presented, the leading sample is the leading sample in the presentation order. When the leading clock time indicated by the leading clock time information is the clock time (leading DTS) at which the leading sample is decoded, the leading sample is the leading sample in the decoding order.

In data transmission device 10 and the data transmission method of the exemplary embodiment, the leading clock time information indicates the leading clock times (for example, the leading PTS) of the plurality of specific coded data units (for example, the plurality of specific MPUs) in which the presentation or decoding is started after the transmission of the leading clock time information. When receiving the leading clock time information, the data playback device can acquire the leading clock time of each of the plurality of specific coded data units in which the presentation or decoding is started after that, namely, the proper leading clock time. As a result, the data playback device can properly start the presentation or decoding of each of the plurality of specific coded data units at each leading clock time. Accordingly, the data transmission device of the present disclosure can sufficiently be applied to the broadcasting in which the playback needs to be performed at the predetermined clock time. Because the leading clock time of each of the plurality of specific coded data units is indicated in the leading clock time information, when the data playback device can start the reception of another coded data unit even if the data playback device cannot receive one of the specific coded data units, the data playback device can start the presentation or decoding of the specific coded data unit at the proper clock time.

Data transmission device 10 and the data transmission method of the exemplary embodiment will be described in detail below. The coded data unit, the sample, and the leading clock time will be described below with the MPU, the access unit, and the leading PTS as specific examples.

The leading clock time information of the exemplary embodiment includes at least the leading PTS of the MPU that is transmitted immediately after the transmission clock time of the leading clock time information.

The leading PTS indicates the PTS of the sample, which constitutes the head in the presentation (display) order in the MPU, in the form identical to that of the absolute clock time. For the MMT, the absolute clock time is expressed by the UTC, and a value in which the UTC is acquired by an NTP (Network Time Protocol) is used as the absolute clock time. The absolute clock time is not limited to the UTC, but any reference clock, such as an STC (System Time Clock) in the MPEG-2 system, which can express the absolute clock time, can be used as the absolute clock time.

Figure 4:
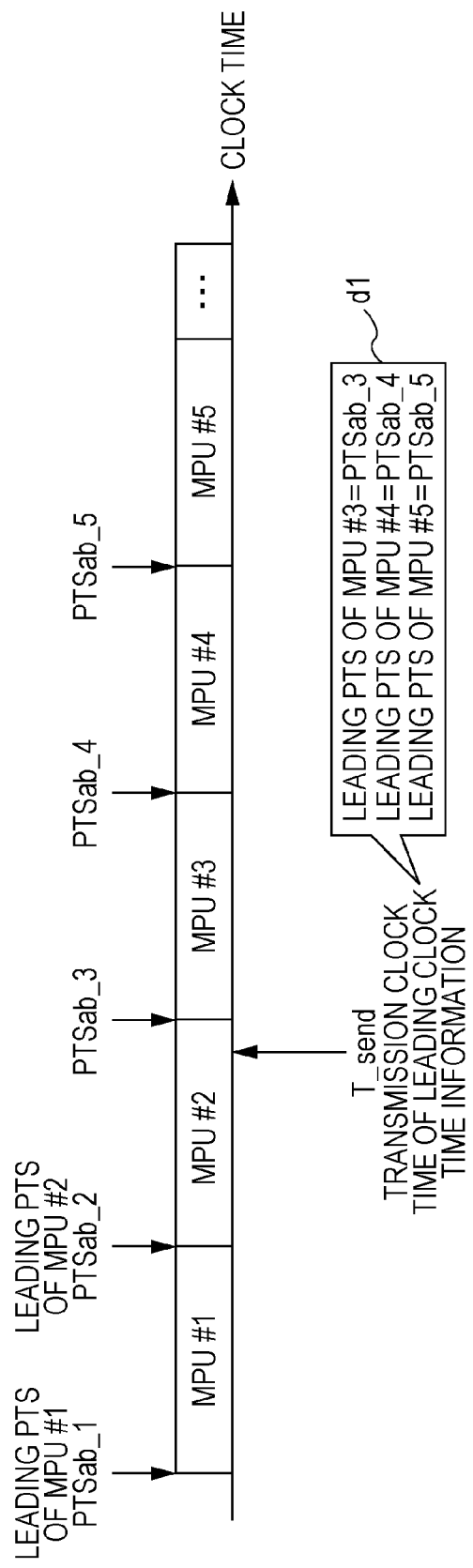
FIG. 4 is an explanatory view illustrating a data transmission method of the exemplary embodiment.

FIG. 4 is an explanatory view of the data transmission method of the exemplary embodiment.

As illustrated in FIG. 4, although leading clock time information d1 is transmitted at clock time T_send, the leading PTS of MPU (MPU #3, MPU #4, and MPU #5) that is not transmitted yet is stared at clock time T_send. Specifically, leading clock time information d1 indicates a sequence number of MPU #3 transmitted immediately after clock time T_send while correlating the sequence number of MPU #3 with the leading PTS of MPU #3, indicates a sequence number of MPU #4 while correlating the sequence number of MPU #4 with the leading PTS of MPU #4, and indicates a sequence number of MPU #5 while correlating the sequence number of MPU #5 with the leading PTS of MPU #5. In FIG. 4, the numerical value added to a neighbor to the right of the MPU together with # is the sequence number (identification information) of the MPU. The MPU of the sequence number indicated by leading clock time information d1 is the specific coded data unit.

In the case where leading clock time information d1 is transmitted at clock time T_send, the data playback device acquires leading clock time information d1 to start the reception from, for example, data of MPU #4. At this point, the data playback device acquires the leading PTS (PTSab_4) of MPU #4 from leading clock time information d1, and starts the presentation of MPU #4 when the current clock time becomes clock time PTSab_4.

In the case where the MMT package is constructed with a plurality of assets (a string constructed with the plurality of MPUs in each of the audio and video), data transmission device 10 transmits leading clock time information d1 in each asset. Leading clock time information d1 may indicate either the leading DTS instead of the leading PTS of the MPU or both the leading PTS and the leading DTS. At this point, the leading DTS indicates the PTS of the sample, which constitutes the head in the decoding order in the MPU, in the form identical to that of the absolute clock time.

In the exemplary embodiment, leading clock time information d1 in the MPU of the MMT is described by way of example. Alternatively, leading clock time information d1 may indicate the leading clock time of the coded data unit except for the MPU. That is, the exemplary embodiment can be applied to any format, such as an MPEG-DASH (Dynamic Adaptive Streaming over HTTP) segment and an MP4 movie fragment, in which the PTS or DTS of the access unit (corresponding to the MP4, MMT, or MPEG-DASH sample) in the content cannot be indicated in the format identical to that of the absolute clock time. In the transmission of the MPU or MPEG-DASH segment, the header information such as moov or mdat is not transmitted, but only the sample data constituting the MPU may be transmitted. In this case, the relative value to leading clock time information d1 of the PTS or DTS in the sample data of the MPU may be transmitted as information different from the MPU. The data transmission method of the exemplary embodiment can be applied to the case where the content is received and played back by streaming (including multicast and broadcast) or download in the broadcasting or communication network.

A number and a range of the leading PTS of the MPU, which are indicated in leading clock time information d1, will be described in detail below.

Generator 11 of data transmission device 10 stores the leading PTSs of the plurality of MPUs in leading clock time information d1. The leading PTSs of the plurality of MPUs indicate the clock time identical to or earlier than final reception clock time T_last. As expressed by the following (equation 1), final reception clock time T_last is defined as a clock time in which maximum delay time Max_delay and propagation time Trans_time are added to transmission clock time T_send.

$$T\_last = T\_send + Trans\_time + Max\_delay \quad \text{(equation 1)}$$

In (equation 1), T_send is a transmission clock time of leading clock time information d1, and Trans_time is a propagation time (a time until the data playback device receives data since the data is transmitted) of data in a transmission passage. Max_delay is a maximum value of a delay time until the reception of the MPU is started since the data playback device receives leading clock time information d1.

Assuming that the MPU is a random access unit (the head of the MPU is a random access point), the data playback device can decode the data including the MPU from the MPU in the case where the data playback device can initially acquire the leading data of the MPU after receiving leading clock time information d1.

For example, even if the data playback device starts the reception immediately after the leading data of MPU #3 in FIG. 4, the decoding can be started from not MPU #3, but MPU #4. That is, a time lag for a playback time length of the MPU is generated at most until the starting of the decoding since the starting of the reception. Accordingly, generator 11 of data transmission device 10 may calculate maximum delay time Max_delay by adding a maximum value of the playback time length of the random access unit such as the MPU to the delay time until the reception of the MPU data is started since the reception of leading clock time information d1.

In the case where the MPU is not the random access unit, generator 11 of data transmission device 10 may decide maximum delay time Max_delay based on a time until the reception of the data of the random access point is started since leading clock time information d1 is received.

Generator 11 of data transmission device 10 may decide not the strict transmission clock time of leading clock time information d1 but an estimated value of the transmission clock time or the clock time at which the leading clock time information d1 is generated as transmission clock time T_send.

In the case where the generation clock time of leading clock time information d1 is used as transmission clock time T_send, generator 11 decides final reception clock time T_last in consideration of a difference between the generation clock time and the actual transmission clock time. For example, when transmitter 12 transmits leading clock time information d1 or the MPU while packetizing leading clock time information d1 or the MPU (such as an MMT packet, a TS packet, and an RTP packet), transmitter 12 multiplexes the packet of the data of leading clock time information d1 or MPU. At this point, sometimes the packet of leading clock time information d1 and the MPU packet are not multiplexed in the ascending order of the clock time at which the data included in the packet is generated. For example, possibly the MPU generated after leading clock time information d1 is transmitted before leading clock time information d1.

Accordingly, generator 11 may decide final reception clock time T_last based on an amount of fluctuation in transmission clock time caused by an order change during the packet multiplexing. However, the problem is not generated because the packet multiplexing is not performed in the data (such as an MPEG-DASH content) acquired by download.

Generator 11 may periodically generate leading clock time information d1, and transmitter 12 may transmit leading clock time information d1 every time leading clock time information d1 is generated. The plurality of leading PTSs indicated by sequentially-transmitted leading clock time information d1 are updated according to transmission clock time T_send of leading clock time information d1.

Assuming that T is a transmission period, next leading clock time information d1 is transmitted at clock time (T_send+T) after leading clock time information d1 is transmitted at clock time T_send. Next leading clock time information d1 indicates at least the leading PTS of the MPU that is transmitted immediately after clock time (T_send+T). Leading clock time information d1 transmitted at clock time T_send needs not to indicate the leading PTS of the MPU after clock time (T_send+T). Accordingly, generator 11 may compare the clock time calculated from (equation 1) to (T_send+T), and decide a smaller one as T_last (one of the values in the case where the clock time is equal to (T_send+T)).

Because propagation time Trans_time is kept constant in the broadcasting, generator 11 can decide propagation time Trans_time according to a broadcasting system such as terrestrial broadcasting and satellite broadcasting. Particularly, propagation time Trans_time may be ignored in the terrestrial broadcasting. Maximum delay time Max_delay can also be defined by an operation regulation in broadcasting service. In the case where the data playback device operates in synchronization with the reference clock time, propagation time Trans_time can be ignored because propagation time Trans_time does not need not to be considered.

On the other hand, in the communication network, propagation time Trans_time fluctuates according to a congestion status of the network. Accordingly, generator 11 may set propagation time Trans_time in consideration of the worst case, adaptively set propagation time Trans_time after a propagation time from the transmission server (data transmission device 10) to the data playback device is estimated.

Sometimes leading clock time information d1 and the MPU are received through different channels (for example, leading clock time information d1 is received by HTTP, and the MPU is received by an MMT protocol or an RTP (Real-time Transport Protocol)). In such cases, after acquiring leading clock time information d1, sometimes data transmission device 10 receives the data of the MPU transmitted before the transmission clock time of leading clock time information d1 (in FIG. 4, the data of MPU #1 or MPU #2 is received after leading clock time information d1 is received). Accordingly, generator 11 may include the leading PTS of the MPU transmitted before transmission clock time T_send in leading clock time information d1.

In the broadcasting, because leading clock time information d1 is transmitted by an MPEG-2 TS section or an MMT message, the MPU having the leading PTS indicating the clock time before transmission clock time T_send is not received after transmission clock time T_send. However, the similar problem can be generated in the case where leading clock time information d1 is acquired from a transmission passage, such as the communication network, except for the broadcasting.

In the above example, generator 11 calculates final reception clock time T_last using (equation 1). Alternatively, final reception clock time T_last may be decided by not performing the calculation but adding a predetermined time length to transmission clock time T_send.

A method for generating leading clock time information d1 will be described in detail.

Generator 11 includes a leading clock time information generator that generates leading clock time information d1.

Figure 5:
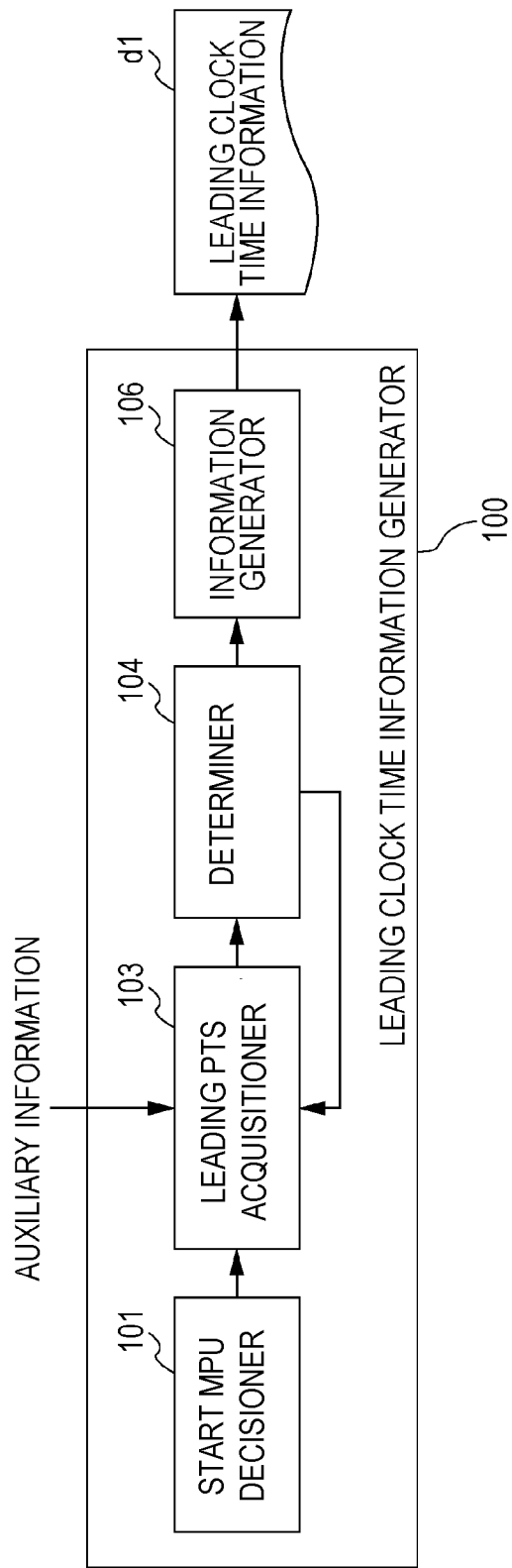
FIG. 5 is a block diagram illustrating the leading clock time information generator of the exemplary embodiment.

FIG. 5 is a block diagram illustrating the leading clock time information generator of the exemplary embodiment.

Leading clock time information generator 100 includes start MPU decisioner 101, leading PTS acquisitioner 103, determiner 104, and information generator 106.

Start MPU decisioner 101 decides the MPU transmitted immediately after transmission clock time T_send of leading clock time information d1 as a start MPU, and notifies leading PTS acquisitioner 103 of the identification information on the start MPU.

Leading PTS acquisitioner 103 acquires auxiliary information, and sequentially acquires the leading PTS of each MPU subsequent to the start MPU indicated by the identification information of which start MPU decisioner 101 notifies leading PTS acquisitioner 103. Leading PTS acquisitioner 103 notifies determiner 104 of the acquired leading PTS every time the leading PTS is acquired.

Determiner 104 determines whether the leading PTS of which leading PTS acquisitioner 103 notifies determiner 104 indicates a clock time before final reception clock time T_last.

Information generator 106 generates leading clock time information d1 based on a determination result of determiner 104.

Figure 6:
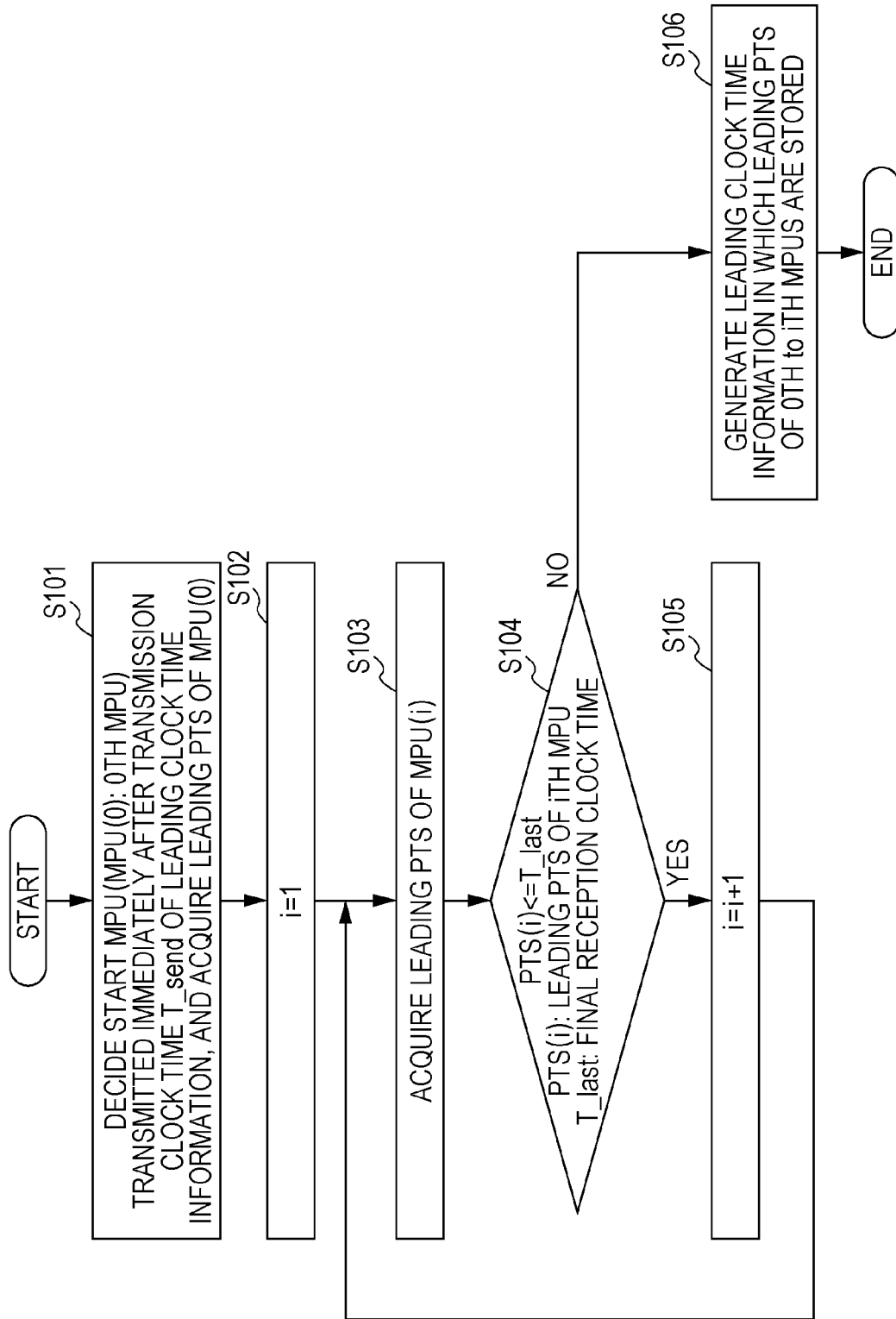
FIG. 6 is a flowchart illustrating operation of the leading clock time information generator of the exemplary embodiment.

FIG. 6 is a flowchart illustrating operation of leading clock time information generator 100 of the exemplary embodiment.

Start MPU decisioner 101 decides the start MPU transmitted immediately after transmission clock time T_send of leading clock time information d1. The start MPU is i=0th MPU in a string constructed with the plurality of MPUs included in the MMT asset, and is expressed as MPU(0). i is a sequence number (identification information). At this point, start MPU decisioner 101 notifies leading PTS acquisitioner 103 of the identification information on the decided start MPU. When acquiring the identification information from start MPU decisioner 101, leading PTS acquisitioner 103 acquires the leading PTS of start MPU (MPU(0)) indicated by the identification information by referring to auxiliary information as needed (Step S101).

Leading PTS acquisitioner 103 sets number i to 1 (Step S102), and acquires the leading PTS of MPU(1) that is of the i=first MPU by referring to the auxiliary information as needed (Step S103). Leading PTS acquisitioner 103 notifies determiner 104 of the acquired leading PTS.

Then, when acquiring the leading PTS of MPU(1) from leading PTS acquisitioner 103, determiner 104 determines whether the leading PTS indicates the clock time before final reception clock time T_last (Step S104). For example, in the broadcasting and communication network, propagation time Trans_time in (equation 1) varies according to the transmission passage through which the MMT data is transmitted. Accordingly, determiner 104 may set a different value to propagation time Trans_time according to the transmission passage through which the MMT data (MPU) is transmitted. For example, in the case where two assets are separately transmitted by broadcasting and communication network, determiner 104 sets propagation time Trans_time for the broadcasting and sets propagation time Trans_time for the communication network to the two assets, respectively.

When determining that the leading PTS indicates the clock time before final reception clock time T_last (YES in Step S104), determiner 104 notifies leading PTS acquisitioner 103 of a determination result. As a result, leading PTS acquisitioner 103 increments number i (Step S105). In the example, because of number i=1, leading PTS acquisitioner 103 updates number i to 2. Leading PTS acquisitioner 103 repeatedly performs the pieces of processing from Step S103. That is, leading PTS acquisitioner 103 acquires the leading PTS of the MPU identified by updated number i.

On the other hand, when determining that the leading PTS does not indicate the clock time before final reception clock time T_last (NO in Step S104), determiner 104 notifies information generator 106 of the determination result. As a result, information generator 106 generates leading clock time information d1 in which the leading PTSs of the 0th to ith MPUs are stored (Step S106). The generated leading clock time information d1 indicates the identification information (for example, a sequence number) on the leading PTS and the leading PTS of the MPU in each of the 0th to ith MPUs while correlating the identification information on the leading PTS and the leading PTS of the MPU with each other. Information generator 106 may store the leading PTS of the 0th MPU (start MPU) and the playback time lengths of the start MPU and each subsequent MPU (the MPU subsequent to the start MPU) in leading clock time information d1. Information generator 106 may store the leading PTS of the 0th MPU (start MPU) and a flag indicating whether the playback time lengths of the start MPU and each subsequent MPU are kept constant in leading clock time information d1. In this case, when the flag indicates that the playback time length is kept constant (flag=1), information generator 106 stores only the leading PTS, playback time length, and flag of the start MPU in leading clock time information d1. On the other hand, when the flag indicates that the playback time length is not kept constant (flag=0), information generator 106 stores not only the leading PTS and flag of the start MPU but also the playback time lengths of the start MPU and each subsequent MPU in leading clock time information d1.

The processing in Step S103 of FIG. 6 will be described below.

A method for acquiring the leading PTS of the ith MPU (MPU(i)) depends on the following three cases. The three cases include a first case in which MPU(i-1) already exists, a second case in which MPU(i-1) can be generated from the already existing coded data although MPU(i-1) does not exist, and a third case in which the coded data does not exist but coding processing is required to generate MPU(i-1).

The first case will be described below.

In the first case, leading PTS acquisitioner 103 acquires PTS(i) that is of the leading clock time of MPU(i) by adding a sum of the playback time lengths of the samples constituting MPU(i-1) to PTS(i-1) that is of the leading PTS of MPU(i-1). At this point, leading PTS acquisitioner 103 acquires the sum of the playback time lengths by analyzing the MP4 header in MPU(i-1). For example, the sum of the playback time lengths is dealt with as the auxiliary information.

The second case will be described below.

In the case where the coded data is video data, leading PTS acquisitioner 103 decides at least one random access unit constituting MPU(i-1) from the coded data. Leading PTS acquisitioner 103 acquires PTS(i) by adding the sum (for example, the auxiliary information) of the playback time lengths of the samples constituting the decided at least one random access unit to PTS(i-1). The random access unit corresponds to a sequence started from an IDR picture in MPEG-4 AVC or HEVC (High Efficiency Video Coding) or a GOP of MPEG-2 Video.

Leading PTS acquisitioner 103 may decide the random access unit constituting the MPU using the playback time length previously set to the MPU. For example, when the playback time length of the MPU is previously set to 2 seconds, and when the playback time length of each random access unit is set to 1 second, leading PTS acquisitioner 103 decides the two random access units constituting the MPU.

At this point, for example, sometimes a frame rate of the coded data changes in a CM (Commercial Message) portion of the broadcasting. The playback time length of the random access unit also changes when the frame rate changes (for example, the frame rate switches from 24 Hz to 60 Hz). Accordingly, leading PTS acquisitioner 103 may decide the random access unit constituting the MPU in consideration of the change.

On the other hand, in the case where the coded data is audio data or voice data, the coded data can be decoded from any access unit constituting the coded data. Therefore, leading PTS acquisitioner 103 decides the playback time length of each access unit based on a sampling frequency.

Additionally, leading PTS acquisitioner 103 decides the access unit constituting MPU(i−1) based on the previously-set playback time length of the MPU. Leading PTS acquisitioner 103 acquires PTS(i) by adding the sum of the playback time lengths of the access units to PTS(i−1).

The third case will be described below.

In the case where the coded data is video data, leading PTS acquisitioner 103 previously sets a structure (for example, a number of access units constituting the random access unit or a reference structure between the access units) of the random access unit used in the coding. Leading PTS acquisitioner 103 calculates the playback time length of the random access unit based on the previously set structure, and acquires PTS(i) by adding the playback time length as the auxiliary information to PTS(i−1).

In this case, a coding part (not illustrated) that codes the video data to generate the coded data codes the video data according to the previously-set structure of the random access unit. The coding part may be included or not included in data transmission device 10.

Alternatively, the structure (structure A) of the previously-set random access unit may differ from the actual structure (structure B) of the coded data that is coded and generated by the coding part. At this point, data transmission device 10 may calculate a difference between the leading PTS of the MPU corresponding to structure A and the leading PTS of the MPU corresponding to structure B, and store information (difference information) indicating the difference in header information (such as a box in 'moof') of the MPU or the header of the MMT packet. For example, it is assumed that the random access unit of structure A is constructed with 15 access units, that the random access unit of structure B is constructed with 18 access units, and that the access unit has the playback time length of 20 msec. In structure B, because the playback time length is longer than the estimated value by 60 msec (=(18−15)×20 msec), data transmission device 10 stores the difference information indicating that the playback time length is longer than the estimated value by 60 msec in the header or the like.

The data playback device that receives the difference information corrects the leading PTS indicated by leading clock time information d1 based on the difference information. The data playback device reflects the difference information in the leading PTS indicated by leading clock time information d1 when calculating the leading PTS of each MPU subsequent to the MPU corresponding to the corrected leading PTS. For example, the data playback device checks whether the difference information exists, and decides the leading PTS on which the difference information has an influence when the difference information exists.

At this point, information generator 106 may include information indicating whether the leading PTS is a predicted value, which is decided based on the previously-set structure of the random access unit, in leading clock time information d1. The information may be included as information common to each leading PTS in leading clock time information d1, or as information separately set to each leading PTS.

When the structure of the random access unit changes due to the change in frame rate or the like, the playback time length of the random access unit also changes. Accordingly, data transmission device 10 may store the information indicating the change of the playback time length in the header or the like.

On the other hand, in the case where the coded data is the audio data or voice data, leading PTS acquisitioner 103 decides PTS(i) by the method similar to that of the second case based on the previously-set playback time length of the MPU. The playback time length of the access unit changes when the sampling frequency changes in the access unit constituting MPU(i−1). Accordingly, data transmission device 10 may store the information indicating the change of the playback time length in the header or the like.

When acquiring the leading PTS of MPU(0) in Step S101 of FIG. 6, leading PTS acquisitioner 103 acquires the leading PTS of MPU(0) by performing the processing similar to that in Step S103 based on the information on the preceding MPU of MPU(0).

Figure 7:
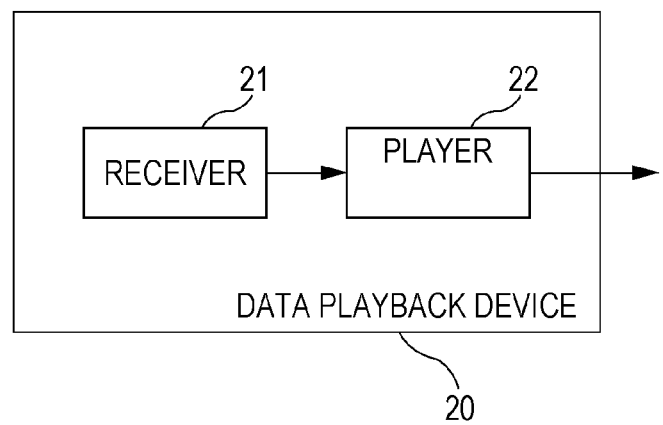
FIG. 7 is a block diagram illustrating a data playback device of the exemplary embodiment.

FIG. 7 is a block diagram illustrating the data playback device of the exemplary embodiment.

Data playback device 20 of the exemplary embodiment is a device that can sufficiently be applied to the broadcasting, and data playback device 20 includes receiver 21 and playback part 22.

Receiver 21 receives the plurality of coded data units each of which is constructed with the plurality of samples, the reference clock time information indicating the reference clock time used to set the current clock time, and leading clock time information d1 indicating the leading clock time of the clock time the leading sample of the coded data unit is presented or decoded. Playback part 22 plays back the received plurality of coded data units.

At this point, leading clock time information d1 indicates the leading clock time of the plurality of specific coded data units that are of the plurality of coded data units in which the presentation or decoding is started after the reception of leading clock time information d1 in the received plurality of coded data units. Each of the received plurality of coded data units indicates a time point where each of the plurality of non-leading samples that are of the plurality of samples except for the leading sample in the coded data unit is presented or decoded as a relative value to a time point of another sample in the coded data unit.

Specifically, playback part 22 plays back the plurality of samples such that the plurality of samples included in the plurality of specific coded data units are presented or decoded at a time corresponding to the current clock time that is set according to the reference clock time indicated by the reference clock time information, the leading clock times of the plurality of specific coded data units indicated by leading clock time information d1, and the relative value of each of the plurality of non-leading samples indicated by the received plurality of coded data units.

Figure 8:
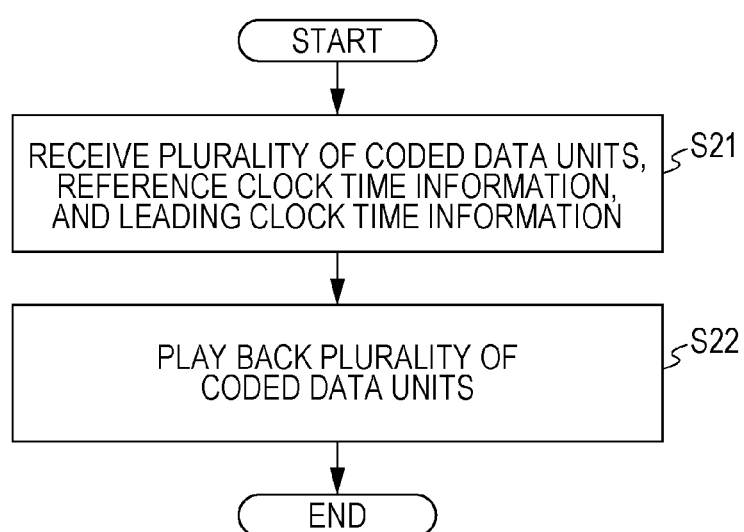
FIG. 8 is a flowchart illustrating operation of the data playback device of the exemplary embodiment.

FIG. 8 is a flowchart illustrating data playback device 20 of the exemplary embodiment.

Receiver 21 receives the plurality of coded data units, the reference clock time information, and leading clock time information d1 (Step S21). Playback part 22 plays back the received plurality of coded data units (Step S22). That is, playback part 22 plays back the plurality of samples such that the plurality of samples included in the plurality of specific coded data units are presented or decoded at a time corresponding to the current clock time that is set according to the reference clock time indicated by the reference clock time information, the leading clock times of each of the plurality of specific coded data units indicated by leading clock time information d1, and the relative value of each of the plurality of non-leading samples indicated by the received plurality of coded data units.

For example, similar to the above description, the coded data unit is the MPU in the MMT, and the sample is the access unit. The reference clock time is a clock time common to data transmission device 10 and data playback device 20 or a clock time used to synchronize between data transmission device 10 and data playback device 20. For example, the reference clock time is the UTC or the STC. In each MPU in which the presentation or decoding is started after the transmission of leading clock time information d1, leading clock time information d1 indicates identification information (such as a sequence number) on the MPU and the leading clock time of the clock time at which the leading access unit in the MPU is presented or decoded while the identification information on the MPU and the leading clock time are correlated with each other. The leading sample (access unit) in the coded data unit (MPU) is a leading sample in presentation order or a leading sample in decoding order.

In data playback device 20 and the data playback method of the exemplary embodiment, all the samples (access units) included in the plurality of coded data units can be presented or decoded at the predetermined clock time, and the data playback method of the present disclosure can sufficiently be applied to the broadcasting in which the playback needs to be performed at the predetermined clock time.

Data playback device 20 and the data playback method of the exemplary embodiment will be described in detail below.

Playback part 22 includes a leading PTS decisioner that decides the leading PTS of each MPU that is presented or decoded based on leading clock time information d1.

FIG. 9 is a block diagram illustrating the leading PTS decisioner of the exemplary embodiment.

Leading PTS decisioner 200 includes program information acquisitioner 201, leading clock time information acquisitioner 202, leading MPU acquisitioner 203, leading PTS determiner 204, first acquisitioner 205, and second acquisitioner 206.

Program information acquisitioner 201 acquires MMT program information (specifically, MPT) from the MMT package received by receiver 21. The MMT program information is information transmitted from data transmission device 10, and program information acquisitioner 201 may acquire the MMT program information through receiver 21 or with no use of receiver 21. The MMT program information includes the identification information on each asset constituting the MMT package and the access information (the information necessary for the acquisition of the asset such as the ID of the MMT packet in which the asset data is transmitted and the URL in which the asset data is transmitted) on each asset.

Leading clock time information acquisitioner 202 acquires the program information from program information acquisitioner 201, and acquires leading clock time information d1 on the asset from the MMT package in each asset constituting the MMT package based on the program information. Leading clock time information acquisitioner 202 notifies leading MPU acquisitioner 203 that leading clock time information d1 is acquired, and outputs leading clock time information d1 to leading PTS determiner 204.

Similarly to the program information, leading clock time information d1 may be transmitted while stored in the MMT message. When the MMT data is transmitted by MPEG-2 TS, leading clock time information d1 may be stored as section data such as a descriptor of PMT (Program Map Table). In the use of MPEG-DASH, leading clock time information d1 may be stored as information on the segment in MPD (Media Presentation Description). Alternatively, leading clock time information d1 may separately be transmitted. The program information or leading clock time information d1 may be acquired from the transmission passage different from that of the MPU. In this case, for example, data playback device 20 can access a server on the communication network to acquire the program information on the MPU transmitted by broadcasting or leading clock time information d1 in advance of the reception of the MPU. A difference between the transmission clock time of leading clock time information d1 and the start clock time of the reception, presentation, or decoding of the MPU increases compared with the case where leading clock time information d1 and the MPU are transmitted through the identical transmission passage. Accordingly, in consideration of the difference, data transmission device 10 may decide the MPU corresponding to the leading PTS stored in leading clock time information d1.

When leading clock time information acquisitioner 202 notifies leading MPU acquisitioner 203 that leading clock time information d1 is acquired, leading MPU acquisitioner 203 acquires the sequence number of the MPU in which the leading data (leading access unit) is initially received after the acquisition of leading clock time information d1. Leading MPU acquisitioner 203 notifies leading PTS determiner 204 of the sequence number.

Leading PTS determiner 204 determines whether the leading PTS of the MPU having the sequence number of which leading PTS determiner 204 is notified by leading MPU acquisitioner 203 is included in leading clock time information d1 output from leading clock time information acquisitioner 202.

When leading PTS determiner 204 determines that the leading PTS is included, first acquisitioner 205 acquires the leading PTS of the MPU having the sequence number from leading clock time information d1, and outputs the acquired leading PTS.

When leading PTS determiner 204 determines that the leading PTS is not included, second acquisitioner 206 calculates the leading PTS of the MPU having the sequence number based on leading clock time information d1, and outputs the calculated leading PTS.

In the audio, during the decoding, the initialization information can be stored as the sample data different from the header of moov or moof. In this case, because the decoding can be started from any sample, the presentation or decoding may be started from the initially-received sample without waiting for the head of the MPU. The sequence number of the MPU to which the sample data stored in the payload belongs and the number of the sample in the decoding order of the MPU are indicated in the header of the MMT packet. Accordingly, the DTS or PTS of the sample can be decided based on the pieces of information.

FIG. 10 is a flowchart illustrating operation of leading PTS decisioner 200 of the exemplary embodiment.

Program information acquisitioner 201 acquires the program information (Step S201). Leading clock time information acquisitioner 202 acquires leading clock time information d1 from the MMT package based on the program information (Step S202).

Leading MPU acquisitioner 203 acquires the sequence number (SQN) of the MPU in which the leading data is initially received after the acquisition of leading clock time information d1 (Step S203). Leading PTS determiner 204 determines whether the leading PTS of the MPU (MPU (SQN)) identified by the acquired sequence number (SQN)

is included in leading clock time information d1 (Step S204). That is, leading PTS determiner 204 determines whether the leading PTS correlated with the acquired sequence number (SQN) is included in leading clock time information d1.

When it is determined that the leading PTS is included in leading clock time information d1 (YES in Step S204), first acquisitioner 205 acquires the leading PTS included in leading clock time information d1 (Step S205).

In Step S103 of FIG. 6, the leading PTS is set on the assumption that the video data or audio data is coded based on predetermined coding operation like the third case, and the actual coding operation differs from the predetermined coding operation. In such cases, a difference is generated in the leading PTS. That is, the difference is generated between the leading PTS of the predicted value included in leading clock time information d1 and the leading PTS that is the actual value.

Therefore, first acquisitioner 205 interprets information, which is included in the MMT package, indicating whether the leading PTS is the predicted value, and acquires the difference information indicating the difference between the predicted value and the actual value when the leading PTS is determined to be the predicted value. First acquisitioner 205 may reflect the difference information in the leading PTS included in leading clock time information d1, thereby acquiring the leading PTS in which the difference information is reflected. First acquisitioner 205 may determine whether the difference information exists, and reflect the difference information in the leading PTS included in leading clock time information d1 when the difference information exists. In the case where the difference information is not transmitted from data transmission device 10, first acquisitioner 205 may correct the leading PTS included in leading clock time information d1 using the leading PTS of the MPU subsequent to MPU (SQN). For example, sometimes the leading PTS corresponding to pre-decoding MPU (MPU_pre) subsequent to MPU (SQN) is indicated in the leading clock time information that is repeatedly transmitted after leading clock time information d1. In such cases, when the leading PTS corresponding to MPU (MPU_pre) is not the predicted value, first acquisitioner 205 decides the leading PTS of MPU (SQN) using the leading PTS corresponding to MPU (MPU_pre).

On the other hand, when the leading PTS is not included in leading clock time information d1 (NO in Step S204), second acquisitioner 206 calculates the leading PTS of MPU (SQN) based on leading clock time information d1 (Step S206).

The processing in Step S206 will be described in detail.

In calculating the leading PTS of MPU (SQN), second acquisitioner 206 calculates the playback time length (DUR) of the MPU in which the leading PTS is indicated in leading clock time information d1. Second acquisitioner 206 may calculate the leading PTS of MPU (SQN) on the assumption that the playback time length of each subsequent MPU is equal to the playback time length (DUR). For example, it is assumed that the leading PTSs (PTSab_1, PTSab_2, and PTSab_3) of the MPUs (specific coded data units) of MPU #1 to MPU #3 are stored in leading clock time information d1. In this case, second acquisitioner 206 calculates the playback time length of MPU #1 by (PTSab_2-PTSab_1), and calculates the playback time length of MPU #2 by (PTSab_3-PTSab_2). Second acquisitioner 206 assumes that the playback time lengths of MPU #3 and each MPU subsequent to MPU #3 are equal to the playback time length (DUR) of MPU #2. That is, DUR=(PTSab_3-PTSab_2). At this point, the leading PTS of the MPU (SQN=5), namely, MPU #5 is one in which the playback time lengths of MPU #3 and MPU #4 are added to the leading PTS of MPU #3. It is also assumed that the playback time lengths of MPU #3 and MPU #4 is DUR. Accordingly, second acquisitioner 206 calculates the leading PTS of MPU #5 by leading PTS= (PTSab_3+2×DUR).

In the case where the leading PTS of MPU (SQN) is estimated in the above manner, data playback device 20 can start the presentation (display) or decoding of MPU (SQN) based on the estimated leading PTS. Data playback device 20 may acquire another piece of leading clock time information subsequent to leading clock time information d1, and acquire the leading PTS of the pre-decoding MPU from subsequent another piece of leading clock time information. In this case, data playback device 20 may set the PTS of the access unit initially displayed in the pre-decoding MPU based on the leading PTS acquired from subsequent another piece of leading clock time information. For example, data playback device 20 sets the PTS of the access unit to the leading PTS acquired from subsequent another piece of leading clock time information. Therefore, even if an error is generated in the leading PTS that is estimated during the starting of the playback of the pre-decoding MPU, playback device 20 can correct the error using subsequent another piece of leading clock time information.

When the leading PTS is not included in leading clock time information d1 (NO in Step S204), the decoding and presentation (display) of MPU (SQN) may be started at the clock time previously fixed by the data playback device. For example, after the buffering of the coded data of MPU (SQN), the decoding of the leading sample (access unit) is completed in the decoding order, and the sample is presented at the earliest clock time at which the presentation (display) can be performed. The leading PTS of the subsequent MPU may be adjusted based on subsequent another piece of leading clock time information.

In the case where the sequence number of MPU (SQN) is smaller than the sequence number of the MPU corresponding to the leading PTS indicated by leading clock time information d1, second acquisitioner 206 can calculate the leading PTS of MPU (SQN) by the similar method.

When the leading PTS is not included in leading clock time information d1 (NO in Step S204), second acquisitioner 206 may acquire the leading clock time information again. For example, in the broadcasting, data transmission device 10 periodically transmits the leading clock time information. At this point, every time the leading clock time information is transmitted, data transmission device 10 updates a content of the leading clock time information such that the leading PTS of the MPU transmitted around the transmission clock time of the leading clock time information is indicated in the leading clock time information. Even if the leading PTS of MPU (SQN) is not included in leading clock time information d1, second acquisitioner 206 of data playback device 20 can acquire the leading PTS of MPU (SQN) by acquiring another piece of leading clock time information transmitted after leading clock time information d1. In the case where the sequence number of MPU (SQN) is smaller than the sequence number of the MPU corresponding to the leading PTS indicated by leading clock time information d1, the leading PTS of MPU (SQN) cannot be acquired by another piece of leading clock time information. Accordingly, in this case, second acquisitioner 206 acquires the leading PTS of MPU (SQN) on the assumption of the playback time length of each MPU based on leading clock time information d1. Alternatively, second acquisitioner 206 may separately acquire the leading clock time information indicating the leading PTS of MPU (SQN) from the server.

Playback part 22 of data playback device 20 starts the presentation of the leading access unit in the presentation order included in the MPU corresponding to the leading PTS at the clock time indicated by the leading PTS acquired by first acquisition part 205 or second acquisition part 206. That is, in playing back the leading access unit in the processing target MPU that is one of the plurality of MPUs indicated by leading clock time information d1, playback part 22 presents (decodes) the leading access unit when the current clock time, which is set according to the reference clock time indicated by the reference clock time information, reaches the leading PTS (leading DTS) indicated by leading clock time information d1 in the processing target MPU.

The plurality of access units are arrayed in the MPU. The MPU indicates the time point where each of the plurality of non-leading access units of the plurality of access units except for the leading access unit in the MPU is presented (decoded) as the relative value (difference) to the time point where the preceding access unit in the MPU is presented (decoded).

Accordingly, in starting the presentation of the nth access unit in the presentation order included in the MPU, playback part 22 integrates the relative values of the access units (non-leading access units) from the first access unit (the access unit subsequent to the leading access unit) to the nth access unit in the presentation order included in the MPU. Playback part 22 calculates the PTS of the nth access unit by adding an integration result of the relative values to the leading PTS of the MPU. Playback part 22 starts the presentation of the nth access unit when the current clock time reaches the calculated PTS.

That is, in playing back the processing target non-leading access unit that is one of the plurality of non-leading access units in the processing target MPU, playback part 22 calculates the processing clock time at which the processing target non-leading access unit is presented (decoded). Then, playback part 22 presents (decodes) the processing target non-leading access unit when the current clock time reaches the calculated processing clock time. Playback part 22 calculates the processing clock time by adding the relative value of at least the processing target non-leading access unit in the relative values of the plurality of non-leading access units indicated by the processing target MPU to the leading PTS (leading DTS) indicated by leading clock time information d1 in the processing target MPU.

Thus, in the data transmission method and data playback method of the exemplary embodiment, the MMT data is sequentially transmitted while generated, and the leading PTS of the received MPU can be acquired by referring to the leading clock time information when the transmitted data is played back. In the case where the leading PTS of the MPU in which the reception is started is not included in the initially-received leading clock time information, the leading PTS can be decided by estimating the leading PTS of the MPU based on the content of the leading clock time information or by repeatedly receiving the leading clock time information.

Although the data transmission method and data playback method of the present disclosure are described above, the present disclosure is not limited to the exemplary embodiment.

For example, in the exemplary embodiment, each component may be constructed with dedicated hardware, or made by executing a software program suitable for each component. Each component may be made such that a program execution part such as a CPU and a processor reads and executes the software program recorded in a hard disk or a recording medium such as a semiconductor memory. At this point, the software implementing data transmission device 10 and data playback device 20 of the exemplary embodiment is a program that causes a computer to perform the steps in FIG. 3 or 8.

Sometimes the data of the MPU constituting the asset of the MMT package is transmitted through the transmission passages having different characteristics like the broadcasting and the communication network. At this point, only the data received through one of the broadcasting and the communication network is decoded and played back, or the pieces of data received through both the broadcasting and the communication network are decoded and played back.

Data transmission device 10 may separately store the leading clock time information corresponding to the MPU of the asset transmitted through the broadcasting and the leading clock time information corresponding to the MPU of the asset transmitted through the communication network. In this case, data playback device 20 can selectively process the leading clock time information according to a playback mode.

For example, data transmission device 10 stores the MMT leading clock time information in a table. At this point, data transmission device 10 may separately store the pieces of leading clock time information corresponding to transmission passages of the broadcasting and the communication network in the tables. The tables are identified by identification information. For example, the identification information is an ID of the table. Data transmission device 10 may separately transmit the table corresponding to each of the broadcasting and the communication network through the transmission passages of the broadcasting and the communication network. Alternatively, data transmission device 10 may transmit the table for broadcasting and the table for communication network through the corresponding transmission passages such that the table for broadcasting is transmitted through the broadcasting and such that the table for communication network is transmitted through the communication network. Data transmission device 10 may perform signaling of the ID of the table used, or previously define the ID of the table used. In the case where the broadcasting is used as a service entry, data transmission device 10 may transmit both the tables through the broadcasting. Data transmission device 10 may store the leading clock time information in an MMT descriptor.

The present disclosure is not limited to the exemplary embodiment, but further generalized. For example, data transmission device 10 may separately store and transmit the tables such as MPT (MMT Package Table) and MCIT (MMT Composition Information Table), namely, the information on the asset data acquiring method, the decoding clock time, or the presentation clock time and the information indicating the asset data displaying method in each of the transmission passages such as the broadcasting and the communication network. Data transmission device 10 may transmit the tables through one of the corresponding transmission passages, or transmit the tables such that the table for broadcasting is transmitted through the broadcasting and such that the table for communication network is transmitted through the communication network. For example, in the MMT, the 0th subset of the MPT or MCIT can be dealt with as the subset for broadcasting, and the first subset can be dealt with as the subset for communication network.

The data transmission method and data playback method of the present disclosure can be applied to the following case. That is, the data is transmitted using the conventional MPEG-2 TS in the broadcasting, the data is transmitted using the MMT or MPEG-DASH in the communication passage (communication network), and the pieces of data acquired through the broadcasting and the communication network are dealt with in an integrated way. At this point, the leading clock time information corresponding to the MMT or MPEG-DASH transmitted through the communication passage may be stored in the TS section data. For example, a new descriptor can be defined, and transmitted while stored in the PMT. Alternatively, independently of the broadcasting, a communication server may decide the leading clock time information and transmit the leading clock time information through the communication passage.

When transmitting the asset constructed with the plurality of MPUs to data playback device 20, data transmission device 10 of the exemplary embodiment packetizes the coded data including the MPUs and leading clock time information d1. Data playback device 20 receives the packetized coded data. Even if a packet loss is generated, data playback device 20 of the exemplary embodiment can start the presentation of the MPU at a correct clock time after the generation of the packet loss. When the packet of the MPU is lost, sometimes data playback device 20 cannot acquire the relative value (clock time difference) of the access unit (non-leading access unit) included in the MPU. In such cases, the PTS of each access unit subsequent to the access unit included in the MPU cannot be decided. However, data playback device 20 of the exemplary embodiment can start the presentation of the subsequent MPU from the leading PTS by receiving leading clock time information d1 indicating the leading PTS of the MPU subsequent to the MPU in which the packet loss is generated. As a result, data playback device 20 can quickly restore the playback according to the clock time of the coded data transmitted from transmission device 10.

The following case is also included in the present disclosure.

(1) Specifically, each of the above devices is a computer system constructed with a microprocessor, a ROM, a RAM, a hard disk unit, a display part, a keyboard, and a mouse. A computer program is stored in the RAM or the hard disk unit. The microprocessor operates according to the computer program, whereby each device achieves the function. The computer program is constructed by a combination of a plurality of command codes indicating a commands issued to the computer in order to achieve the predetermined function.

(2) A part of or all the components constituting each device may be constructed with one system LSI (Large Scale Integration). The system LSI is a super-multifunctional LSI in which the plurality of components are integrated and produced on one chip. Specifically, the system LSI is a computer system including the microprocessor, the ROM, and the RAM. The computer program is stored in the RAM. The microprocessor operates according to the computer program, whereby the system LSI achieves the function.

(3) A part of or all the components constituting each device may be constructed with an IC card or a single module, which is detachably attached to each device. The IC card or the module is a computer system constructed with a microprocessor, a ROM, and a RAM. The IC card or the module may include the super-multifunctional LSI. The microprocessor operates according to the computer program, whereby the IC card or the module achieves the function. The IC card or the module may have a tamper-resistant property.

(4) The present disclosure may be the above methods. The methods may be the computer program performed by the computer, or a digital signal including the computer program.

The present disclosure may be one in which the computer program or the digital signal is recorded in a computer-readable recording medium, such as a flexible disk, a hard disk, a CD-ROM, an MO, a DVD, a DVD-ROM, a DVD-RAM, a BD (Blu-ray (registered trademark) Disc), and a semiconductor memory. The present disclosure may be the digital signal recorded in the recording medium.

The present disclosure may be one in which the computer program or the digital signal is transmitted through an electric communication line, a wireless or wired communication line, a network typified by the Internet, a data broadcasting, and the like.

The present disclosure may be a computer system including a microprocessor and a memory, the computer program is stored in the memory, and the microprocessor operates according to the computer program.

The present disclosure may be implemented using another independent computer system such that the program or the digital signal is transported while recorded in the recording medium, or such that the program or the digital signal is transported through the network.

(5) The exemplary embodiments and the modifications may be combined.

Although the data transmission method and data playback method according to the exemplary embodiment of the present disclosure are described above, the present disclosure is not limited to the exemplary embodiment. Various modifications of the exemplary embodiment conceived by those skilled in the art and the combinations of the components of the different exemplary embodiments may also be included in the present disclosure as long as the modifications and combinations do not depart from the present disclosure.

The data transmission method of the present disclosure has an advantage that the data transmission method can sufficiently be applied to the broadcasting. For example, the data transmission method of the present disclosure can be applied to the device or instrument that performs the media transport of the video data and audio data.

What is claimed is:

1. A data transmission method performed by a data transmission device including a generator and a transmitter, the data transmission method comprising:
   generating, using the generator:
      a plurality of coded data units each of which is composed of a plurality of samples;
      reference clock time information indicating a reference clock time; and
      leading clock time information indicating a leading clock time that is a clock time at which a leading sample in a coded data unit is presented or decoded; and
   transmitting, using the transmitter, the generated plurality of coded data units, the generated reference clock time information, and the generated leading clock time information,
   wherein the plurality of coded data units are sequentially transmitted,
   the leading clock time information indicates respective leading clock time of each of a plurality of specific coded data units among the generated plurality of coded data units, the plurality of specific coded data units are a plurality of coded data units, which are to be presented or decoded after the leading clock time information is transmitted, each of the generated plurality of coded data units includes information of a time point at which each sample except for the leading sample in the coded data unit is presented or decoded, as a relative value to a time point of another sample in the coded data unit, and the leading clock time information is transmitted while stored in a MPEG Media Transport Package Table.

2. The data transmission method according to claim 1, wherein the leading clock time information indicates at least the leading clock time of the coded data unit that is transmitted immediately after the leading clock time information is transmitted in the generated plurality of coded data units.

3. The data transmission method according to claim 1, wherein, in the transmitting, the leading clock time information is periodically transmitted.

4. The data transmission method according to claim 3, wherein the leading clock time information indicates the leading clock times of the plurality of specific coded data units in which the presentation or decoding is started until a clock time the next leading clock time information is transmitted.

5. The data transmission method according to claim 1, further comprising calculating a final reception clock time by adding a propagation time necessary for a data playback device to receive data since the data transmission and a delay time necessary for the starting of the reception of the coded data unit since the data playback device receives the leading clock time at which information to the clock time the leading clock time information is transmitted, wherein the leading clock time information indicates the leading clock times of all the coded data units in which the presentation or decoding is started until the final reception clock time since the clock time the leading clock time information is transmitted as the leading clock times of the plurality of specific coded data units in the generated plurality of coded data units.

6. A data playback method performed by a data playback device including a receiver and a player, the data playback method comprising:

receiving, using the receiver:

a plurality of coded data units each of which is composed of a plurality of samples;

reference clock time information indicating a reference clock time; and leading clock time information indicating a leading clock time of a clock time at which a leading sample in a coded data unit is to be presented or decoded; and playing back, using the player, the plurality of coded data units, wherein the plurality of coded data units are sequentially received, the leading clock time information indicates respective leading clock times of a plurality of specific coded data units among the received plurality of coded data units, the plurality of specific coded data units are a plurality of coded data units which are to be presented or decoded after the leading clock time information is received, each of the received plurality of coded data units includes information of a time point at which each of a plurality of non-leading samples sample of a plurality of samples except for the leading sample in the coded data unit is presented or decoded as a relative value to a time point of another sample in the coded data unit, in the playing back, the plurality of samples included in the plurality of specific coded data units are played back so as to be presented or decoded at a time that is set according to the reference clock time indicated by the reference clock time information, a leading clock time of each of the plurality of specific coded data units indicated by the leading clock time information, and a relative value of each of the plurality of non-leading samples indicated by the received plurality of coded data units, and the leading clock time information is received while stored in a MPEG Media Transport Package Table.

7. The data playback method according to claim 6, wherein, in the playing back, in playing back the leading sample in a processing target coded data unit that is one of the plurality of specific coded data units, the leading sample is presented or decoded when the time that is set according to the reference clock time indicated by the reference clock time information reaches the leading clock time of the processing target coded data unit, the leading clock time being indicated by the leading clock time information.

8. The data playback method according to claim 7, wherein, in the playing back, in playing back a processing target non-leading sample that is one of the plurality of the non-leading samples in the processing target coded data unit, a processing clock time at which the processing target non-leading sample is presented or decoded is calculated, and the processing target non-leading sample is presented or decoded when the time that is set according to the reference clock time indicated by the reference clock time information reaches the calculated processing clock time, and in calculating the processing clock time, the processing clock time is calculated by adding at least a relative value of the processing target non-leading sample among relative values of the plurality of the non-leading samples to the leading clock time of the processing target coded data unit, the processing target non-leading sample being indicated by the processing target coded data unit, the leading clock time being indicated by the leading clock time information.

9. A data transmission device comprising:

a generator that generates:

a plurality of coded data units each of which is composed of a plurality of samples;

reference clock time information indicating a reference clock time; and leading clock time information indicating a leading clock time of a clock time a leading sample in a coded data unit is presented or decoded; and a transmitter that transmits the generated plurality of coded data units, the generated reference clock time information, and the generated leading clock time information, wherein the plurality of coded data units are sequentially transmitted, the leading clock time information indicates respective leading clock time of each of a plurality of specific coded data units among the generated plurality of coded data units, the plurality of specific coded data units are a plurality of coded data units which are to be presented or decoded after the leading clock time information is transmitted in the generated plurality of coded data units, each of the generated plurality of coded data units includes information of a time point at which each sample except for the leading sample in the coded data unit is presented or decoded as a relative value to a time point of another sample in the coded data unit, and the leading clock time information is transmitted while stored in a MPEG Media Transport Package Table.

10. A data playback device comprising:

a receiver that receives:

a plurality of coded data units each of which is composed of a plurality of samples;

reference clock time information indicating a reference clock time; and leading clock time information indicating a leading clock time that is a clock time at which a leading sample in a coded data unit is presented or decoded; and a player that plays back the plurality of coded data units, wherein the plurality of coded data units are sequentially received, the leading clock time information indicates respective leading clock times of a plurality of specific coded data units among the received plurality of coded data units, the plurality of specific coded data units are a plurality of coded data units which are to be presented or decoded after the leading clock time information is received, each of the received plurality of coded data units includes information of a time point at which each of a plurality of non-leading samples sample of a plurality of samples except for the leading sample in the coded data unit is presented or decoded, as a relative value to a time point of another sample in the coded data unit, the player plays back the plurality of samples included in the plurality of specific coded data units so as to be presented or decoded at a time corresponding to a time that is set according to the reference clock time indicated by the reference clock time information, a leading clock time of each of the plurality of specific coded data units indicated by the leading clock time information, and a relative value of each of the plurality of non-leading samples indicated by the received plurality of coded data units, and the leading clock time information is received while stored in a MPEG Media Transport Package Table.

* * * * *